(12) United States Patent
Cresswell et al.

(10) Patent No.: US 8,188,756 B2
(45) Date of Patent: May 29, 2012

(54) METHOD FOR DETERMINING THE ELECTRICAL RESISTANCE OF AN ELECTRICAL SUPPLY LEAD TO SENSOR ELEMENTS AND A SENSOR ARRANGEMENT

(75) Inventors: Justin Cresswell, Perdleton, SC (US); Arnulf Pietsch, Regensburg (DE); Gerhard Wild, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 1748 days.

(21) Appl. No.: 10/504,427

(22) PCT Filed: Feb. 14, 2002

(86) PCT No.: PCT/DE02/00538
§ 371 (c)(1),
(2), (4) Date: Nov. 4, 2008

(87) PCT Pub. No.: WO03/069293
PCT Pub. Date: Aug. 21, 2003

(65) Prior Publication Data
US 2009/0212791 A1 Aug. 27, 2009

(51) Int. Cl.
*G01R 27/28* (2006.01)
(52) U.S. Cl. .................................................. 324/691
(58) Field of Classification Search ............... 324/691
See application file for complete search history.

(56) References Cited

U.S. PATENT DOCUMENTS

| | | | | |
|---|---|---|---|---|
| 3,927,842 A | * | 12/1975 | Droll | 242/432 |
| 5,895,843 A | * | 4/1999 | Taylor et al. | 73/86 |
| 6,341,098 B2 | * | 1/2002 | Yamagata et al. | 365/226 |
| 6,392,550 B1 | * | 5/2002 | Najor | 340/576 |
| 6,522,155 B2 | | 2/2003 | Pietsch et al. | |
| 6,584,589 B1 | * | 6/2003 | Perner et al. | 714/721 |
| 6,657,445 B2 | * | 12/2003 | Cresswell et al. | 324/691 |

FOREIGN PATENT DOCUMENTS

| | | |
|---|---|---|
| DE | 200 14 200 | 1/2001 |
| DE | 200 14 200 U1 | 1/2001 |
| EP | 0 895 091 A | 2/1999 |
| EP | 895091 | 2/1999 |
| JP | 07-301654 A1 | 11/1995 |
| JP | 09-203764 A1 | 8/1997 |
| JP | 11-118635 A1 | 4/1999 |
| WO | WO 00/54064 | 9/2000 |
| WO | WO 00 54064 A | 9/2000 |

OTHER PUBLICATIONS

Billen K. "Occupant Classification System for Smart Restraint Systems", Society of Automotive Engieneers Inc., Jan. 1999, pp. 33-38, BNSDOCID XP 002184965.
"Occupant Classification System for Smart Restraint System", Society of Automotive Engineers Inc. Von 1999.

* cited by examiner

*Primary Examiner* — Jeff Natalini
(74) *Attorney, Agent, or Firm* — Laurence A. Greenberg; Werner H. Stemer; Ralph E. Locher

(57) ABSTRACT

The invention relates to a method for determining the electrical resistance of an electrical supply lead to sensor elements and concerns a sensor arrangement. The sensor elements are interconnected to form a sensor arrangement, and the electrical total resistance of the supply lead to the sensor elements is determined by effecting a measurement involving an electrical component. The electrical total resistance of the supply lead to the sensor elements is compared to a reference value, whereby the reference value is the value of the electrical total resistance of a reference component of the circuit arrangement and of its electrical leads. The reference value is also determined by effecting a measurement.

10 Claims, 2 Drawing Sheets

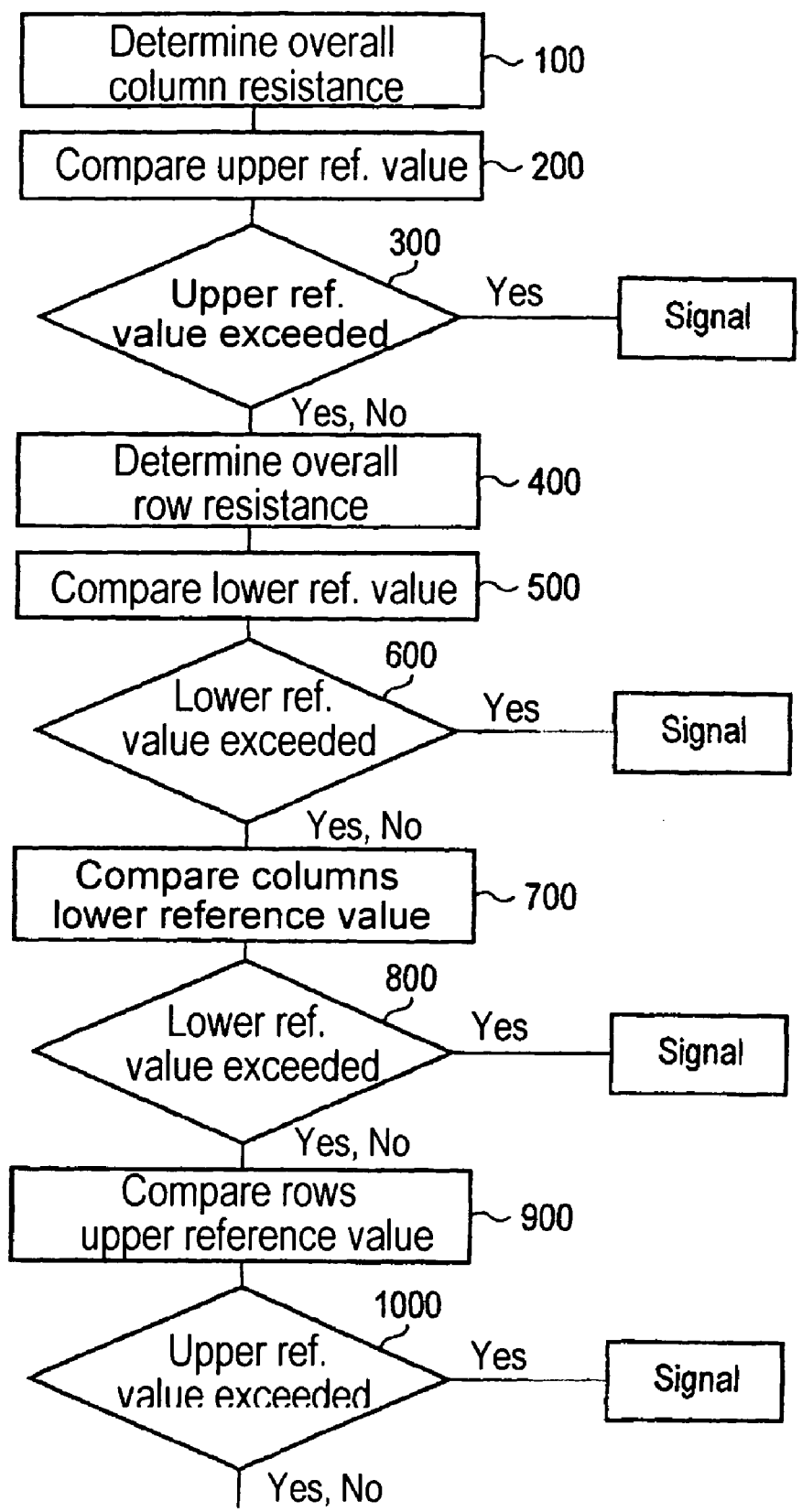

METHOD FOR DETERMINING THE ELECTRICAL RESISTANCE OF AN ELECTRICAL SUPPLY LEAD TO SENSOR ELEMENTS AND A SENSOR ARRANGEMENT

CLAIM FOR PRIORITY

This application is a national stage of International Application No. PCT/DE02/00538 which was published on Aug. 21, 2003, and filed on Feb. 14, 2002.

TECHNICAL FIELD OF THE INVENTION

The invention relates to a method for determining the electrical resistance of an electrical supply lead to sensor elements and a sensor arrangement which is suitable for applying the method thereto.

BACKGROUND OF THE INVENTION

Seat occupancy by the passengers in motor vehicles is an important input variable for a plurality of technical applications in motor vehicles. This applies especially to occupant restraint systems for which efficient use often depends on the sitting position of the motor vehicle occupants. Sensor seat mats consisting of a plurality of pressure-sensitive sensor elements are used for seat occupancy detection in motor vehicles. This are distributed over the surface of the motor vehicle seat into columns and rows and can thereby record the effects of pressure exerted by a person or an object on the seat surface. The individual pressure-sensitive sensor elements of a sensor seat mat mostly consist of pressure-dependent electrical resistors. The pressure acting on the seat surface of the motor vehicle seat is determined by a downstream electrical control unit. This operates by recording the change in electrical resistance of the sensor elements distributed over the seat which provides feedback about the person occupying the seat.

Such sensor arrangements embodied as sensor mats are known from DE 200 14 200 U1 and from the article, Occupant Classification System for Smart Restraint System', Society of Automotive Engineers Inc. of 1999, BNSDOCID XP002184965. When these types of occupant detection systems are used the likelihood of a malfunction must be kept as low as possible. In the event of a malfunction of the occupant detection system there is the danger of serious injury to the vehicle occupants to be protected, since the occupant detection system mostly has a direct influence on the trigger behavior of the occupant restraining means in a motor vehicle.

For example, an undetected increase in line resistance in the current path to the sensor elements of the sensor seat mat could falsify the determination of the resistance of the sensor elements, which would incorrectly determine an occupant weight signal and would be used as a basis for the further evaluation of the occupant detection system. The weight of the vehicle occupants incorrectly determined in this way or even their incorrect classification for example as a particularly large and heavy person could lead to the control unit of the vehicle protection systems releasing an airbag intended to protect the occupants when this is more likely to injure the actual occupants on the vehicle seat.

This is why checks are already usually made at regular intervals on the line resistances of the electrical supply lines to the sensor elements in sensor arrangements for seat occupancy detection. To this end resistor components are arranged in the supply lines to the rows and columns of sensor elements of a sensor seat mat which, together with the electrical lines, form the overall resistance of a supply lead of sensor elements of a sensor seat mat. The basic resistance of each supply lead to sensor elements of a sensor seat mat with the resistor components included within it is determined by measurement and compared with a reference value.

This reference value is usually stored in a memory medium of the occupant detection system and where necessary is made available to a control unit. For example, the control unit requests the reference value stored in an EEPROM of the occupant protection system in order to subsequently compare it with the measured value.

The reference value serves as a limit value of a measurement of the overall resistance of the supply lead. If the overall resistance exceeds the reference value this is detected for example by a downstream control unit of the sensor seat mat.

This procedure is executed on a regular basis, for example before each measurement of the sensor elements, but at least in the runup phase of the occupant detection system after vehicle startup.

The violation of the reference value (of the limit value) indicates possible damage and thus the danger of a possible malfunction of the sensor seat mat, which can possibly result in an incorrect trigger function of the occupant restraining means.

If the occupant protection system detects an error in the sensor seat mat in this way, this information can then be used for example to deactivate the occupant protection system or to limit its use. An occupant detection system error is then usually indicated to the vehicle occupants with the aid of an airbag warning light on a display panel in the vehicle.

The overall resistance of the supply lead to the sensor elements of a sensor arrangement and especially to the rows and columns of sensor elements of a sensor seat mat is also referred to below as the overall resistance of a row or also as the overall resistance of a column.

Suitable resistance components for this leakage or interruption detection measurement at a sensor seat mat are preferably arranged integrated on the sensor seat mat and are similar in structure to the structure of pressure-sensitive sensor elements.

The measuring accuracy however makes monitoring the overall resistance of the supply lead to the sensor elements over the entire operating life of a motor vehicle an extremely difficult measuring task. For the most part the accuracy obtained in determining the line resistance to the sensor elements is too small for a meaningful monitoring of the overall resistance of the supply lead to the sensor elements of the sensor seat mat.

On the one hand this measurement accuracy is conditional on an inaccurate evaluating electronics for recording the overall resistance as a measurement variable.

To keep the costs of the occupant detection system as low as possible, it is however preferable to look for technical solutions in which these inaccurate but nonetheless cost-effective electronics can be employed.

On the other hand the resistance components used vary very widely in their resistance values as a result of manufacturing tolerances.

Account can be taken of the manufacturing-related range of variations in the resistance values of the resistance components by determining the overall resistance value of each individual resistance component together with its line resistances when the sensor seat mat is manufactured and subsequently storing these values in a memory. For a later comparison measurement the stored values for the resistance component are then compared with the current resistance value measured.

However this does not adequately take account of a systematic change of the resistance value of the resistance component during the course of its lifetime within the sensor arrangement in a vehicle seat. The resistance value of the resistance component can change completely during the course of its lifetime. If this causes the overall resistance of the resistance component with its lines to exceed a previously stored reference value, the control unit of the sensor seat mat would if necessary also detect an error in the supply lead to the sensor elements if the change had been effected exclusively by this systematic change of the overall resistance value. This might possibly cause a sensor seat mat to be interpreted as faulty and cause an airbag warning lamp to come on for no reason.

The costs of an unnecessary repair or replacement of a fault-free sensor seat mat are not only unnecessary but are also mostly not insignificant and should therefore be avoided if possible.

One improvement to the previous methods of monitoring of the resistance of the electrical supply lead of sensor elements is represented by monitoring the deviations from the stored reference values, whereby the deviation of the measured overall resistance for each resistance component is compared with the deviation for all other resistance components. If the deviation of the overall resistance for a resistance component differs significantly from that of the others it is not a case of a systematic change of the overall resistance but indicates a fault within the electrical supply lead involved. With this method of operation all systematic changes of the resistance components and their leads are taken into account which might for example be caused by temperature variations and material ageing etc.

Advantageously this also accordingly takes account simultaneously of measurement electronics faults both in the initial determination of the reference values and also for the comparison measurements made subsequently. The danger of incorrect weight interpretation by the occupant protection system is reduced by a significant amount with this method.

The two methods described are however extremely expensive to manufacture and generally not possible to implement on grounds of cost.

SUMMARY OF THE INVENTION

The invention discloses creation of a simple method as well as an underlying sensor arrangement which allows monitoring of a resistance value of a supply lead to sensor elements within a sensor arrangement for seat occupant detection over the entire lifetime of the sensor arrangement such that an increase in the line resistance of a supply lead is detected quickly and safely.

In this case, the overall electrical resistance of the supply lead to the sensor elements is determined for an arrangement of sensor elements. The overall resistance of the supply lead comprises both the electrical resistances of the lines to the sensor elements and also the resistance of one or more electronic components in the current path to and from the sensor elements especially of resistance components.

The overall electrical resistance of the supply lead to the sensor elements determined in this way is compared to a reference value which is determined from the overall electrical resistance of a reference component and of its electrical lines.

A reference component in this case is initially any electronic component in the current path of the supply lead of the sensor elements for which the resistance value can be specified more precisely and which changes less during its entire usable life than the resistance value of the majority of the other components of the circuit used similarly. Usually a reference component is therefore the same as a resistance component in a supply lead to sensor elements.

By contrast with the other comparable resistance elements in a supply lead to sensor elements, the resistance value of a reference component only changes very little with other outside influences remaining the same. Its resistance value preferably remains within a range of tolerances of 1% around its required value while the resistance components used on a sensor mat can exhibit a range of tolerances of a good 25% around their rated value.

The electrical connection of a reference component does not differ in its electrical structure from that of the resistance elements normally used.

Optionally, the reference components can be integrated into the technology of the known resistance components on the sensor seat mat but can also be arranged as components on an external circuit board so that their electrical connection to the sensor elements is the same as that of the usual resistance elements. Especially favorable in particular is the arrangement within a control unit of the occupant protection system.

A reference component is consequently inserted within the supply lead to sensor elements of a sensor seat mat in the circuit in place of the usual resistance elements with a high range of tolerances.

The resistance of the lines in this case is preferably as low as possible. In the ideal case the conventional resistance element and the reference component have the same required value for their resistance.

With a comparative measurement the difference of the overall resistance of a supply lead with a conventional resistance element and the overall resistance of a supply lead with a reference component, the reference value, is determined. If the difference between the two values lies outside the previously defined limit values this indicates a fault within the supply lead of a row or column of sensor elements.

Preferably, the reference value of the comparison measurement serves as the upper or also as the lower limit value of the overall electrical resistance of the supply lead to the sensor elements.

A control unit connected downstream from the sensor seat mat can, in this case, detect an overshoot or undershoot of this reference value (limit value). If the reference value is exceeded or undershot in this way, this is notified as a signal for a fault in the supply lead to the relevant sensor elements to the downstream control unit.

In a further embodiment of the method in accordance with the invention of the overall electrical resistance of the supply lead to the sensor elements is compared with a further reference value. This further reference value too is the value of the overall electrical resistance of a further reference component of the circuit arrangement and its electrical supply lead. This further reference value is also determined by measurement. This further reference value also represents a lower or an upper limit value of the overall electrical resistance of the supply lead to the sensor elements.

In the case of the further reference value too an overshoot or an undershoot of the further reference value by the overall resistance of the lead to the sensor elements counts as a signal for a fault in the sensor arrangement and is notified to a downstream control unit.

Preferably, the reference value and the further reference value are used simultaneously for monitoring the overall electrical resistance of the lead to the sensor elements of a sensor seat mat.

Both the reference value and also the further reference value in this case includes the overall electrical resistance of the reference component or of the circuit arrangement and the relevant electrical supply lines to these two electrical reference components. As when just one reference value is used, both reference values are determined by measurement in each case.

One of the two reference values now represents an upper limit value of the overall electrical resistance of the supply lead to the sensor elements, the other reference value represents the lower limit value. One off the two electronic reference components can in this case signal the overshooting or undershooting of the upper limit value to a downstream control unit, the other reference component in each case can signal the overshooting or undershooting of the lower limit value.

This method allows monitoring of whether the overall electrical resistance of the supply lead to the sensor elements of the sensor arrangement is within a permissible range of values for the application. The range of values in this case is defined by the upper and lower limit value, which are each formed either by the reference value or by the further reference value in the circuit.

Usually the sensor elements of a sensor arrangement for occupant detection in a motor vehicle are arranged in a matrix of rows and columns. With such an arrangement of the sensor elements the method in accordance with the invention for determining the overall electrical resistance of an electrical supply lead to sensor elements is executed. In this way the overall resistance of the supply line of each row and each column can be determined individually by measurement and monitored over the entire operational life of a motor vehicle.

The part of the object relating to the sensor arrangement is achieved by a flat arrangement of sensors, especially by a sensor seat mat for determining seat occupant detection in a motor vehicle. The sensor elements are arranged in a matrix of rows and columns with electrical supply leads to each row and each column of the sensor element which each feature an electronic component.

In accordance with the method described above, these electronic resistance components in the supply leads to the rows and columns of sensor elements are used to determine the overall electrical resistance of the supply lead to the sensor elements of each row and each column. At least one of these are electrical resistance components serves in this case as a reference component.

Preferably, a control unit applies the inventive method to this sensor arrangement.

BRIEF DESCRIPTION OF THE DRAWINGS

The invention is described in more detail below with reference to the exemplary embodiments illustrated in the drawings, in which:

FIG. 2 shows a flowchart of the method in accordance with the invention.

DETAILED DESCRIPTION OF THE INVENTION

Figure 1:
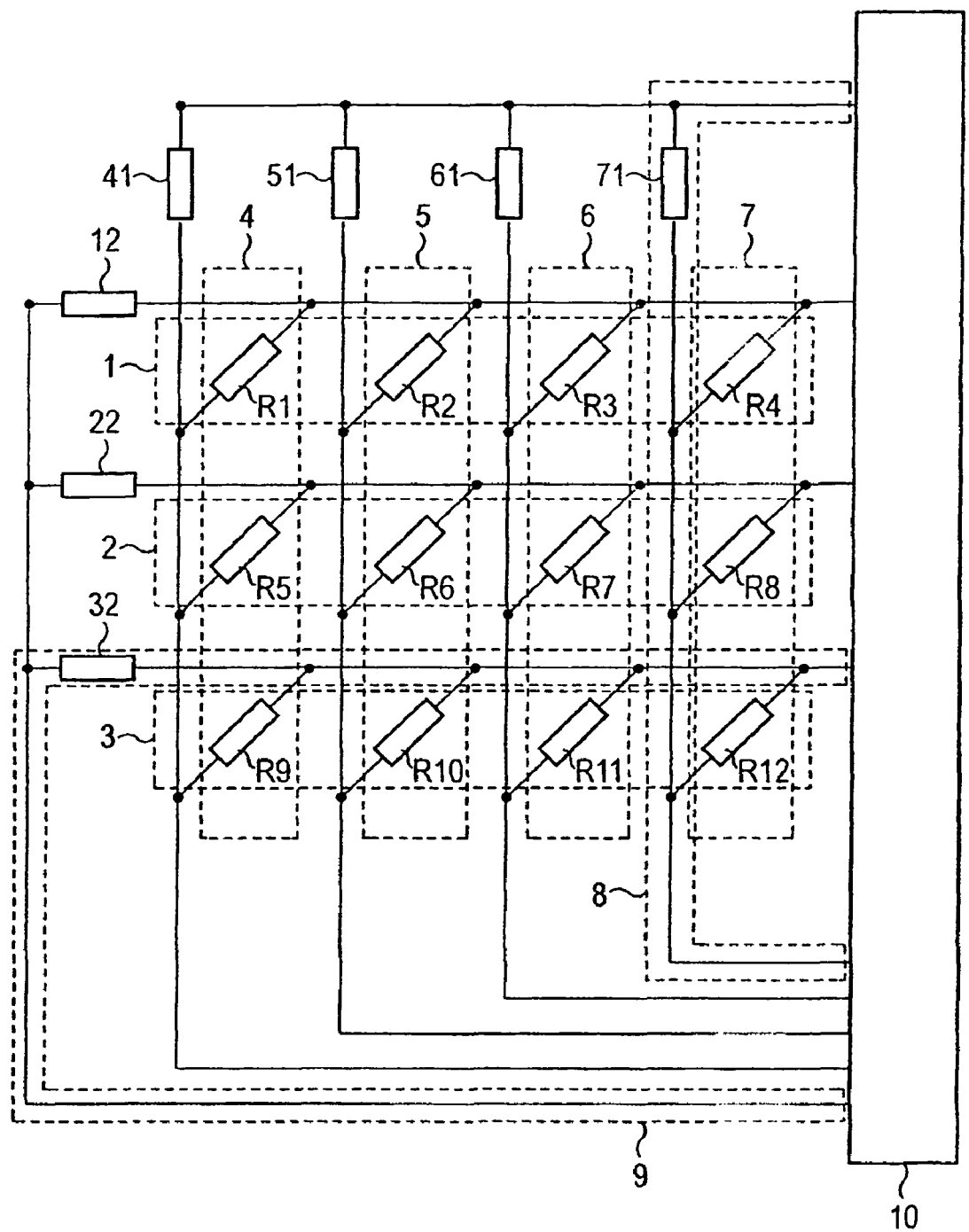
FIG. 1 shows a sensor arrangement according to the invention.

FIG. 1 shows a sensor arrangement in according to the invention as sensor seat mat 11 which is suitable for applying the inventive method to it.

The diagram shows a sensor arrangement including pressure-sensitive sensor elements R1 through R12. Sensor elements R1 through R12 are arranged in three rows and four columns. In FIG. 1 rows 1, 2 and 3 and columns 4 through 7 are shown by broken lines.

Each column and each row possesses its own electrical supply lead which connects its sensor elements to control unit 10.

Each supply lead features an electrical component, here in the form of the resistance components 41 through 71 for the columns 4 to 7 and in the form of the resistance components 12 through 32 for the rows 1 through 3.

Typical of a supply lead to sensor elements is the supply lead 9 to the row 3 of sensor elements shown by dashed lines and also the supply lead 8 to column 7 of sensor elements. The corresponding supply leads to the other rows 1 through 2 and columns 4 through 6 are not indicated separately in FIG. 1 in order not to render the diagram too difficult to follow.

Usually, under the effect of a weight force, the sensor elements R1 through R12 have resistance values of between 5 and 500 kOhm. Without the effect of the force the resistance of the sensor cells is infinite in the ideal case since the surfaces of the sensor cells do not contact each other electrically.

Most resistance components 41 through 71 and 12 through 32 in the supply leads to the columns or the rows of sensor elements respectively have resistance values of between 2 to 6 kOhm.

To enable the method in accordance with the invention, i.e. monitoring the resistance components 41 through 71 and 12 through 32 to be executed, at least one resistance component of the sensor arrangement now features a narrower tolerance range of its resistance value.

In the exemplary embodiment shown, these are the two reference components 41 and 32. Together with their relevant supply lead from and to the control unit 10, the two reference components feature an overall electrical resistance value. The overall resistances of the two reference components 41 and 32 represent the reference values for a comparative resistance measurement of the electrical supply leads to the columns 4 through 7 and rows 1 through 3 of sensor elements. In this case the reference value for resistance component 41 defines an upper limit value and the reference value for resistance component 32 a lower limit value.

In the method in accordance with the invention the overall resistance of the supply leads to the columns 5 through 7 and rows 1 through 2 is now compared with the upper reference value and the lower reference value. If one of the resistance values of the overall resistance of the supply lead of a row or a column does not now lie within an interval between the upper and the lower reference value, control unit 10 recognizes this fact. Values falling outside this reference value interval point to a possible malfunction of the sensor seat mat, which can possibly lead to an incorrect decision to trigger the occupant protection means.

To avoid possible injuries to a vehicle occupant occurring as a result, the occupant protection system (airbag system) is now usually deactivated or it is only used during subsequent operation with restricted functionality. The way in which this can be done for example is for the control of the occupant restraint system to feature a separate modified trigger behavior defined for such cases which, without information from the seat occupancy detection system, offers the best possible protection for the vehicle occupants.

FIG. 2 shows a flowchart of the method in accordance with the invention which refers to elements of the sensor arrangement according to FIG. 1. The method executes as follows:

Procedural step 100: Determining the relevant overall resistance of the supply leads to columns 4 through 7, Procedural step 200: Comparison of the relevant overall resistance of each supply lead to each column with the upper reference value, that means with the overall resistance of the supply lead to column 4, Procedural step 300: If the overall resistance of the supply lead of a column exceeds the upper reference value, control unit 10 detects this fact and issues the signal to the occupant restraining system, Procedural step 400: Determining the relevant overall resistance of the supply leads to rows 1 through 3, Procedural step 500: Comparison of the overall resistance of each supply lead to each row with the lower reference value, that means with the overall resistance of the supply lead to row 3, Procedural step 600: If one of the overall resistances of the supply leads to a row lies below the lower reference value, control unit 10 detects this and outputs a signal to the occupant restraint system, Procedural step 700: Comparison of the relevant overall resistance of the supply leads the columns 5 through 7 with the lower reference value, Procedural step 800: If one of the overall resistance values of one of the columns 5 to 7 lies below the lower reference value, this is recognized by control unit 10 and signaled to the occupant restraint system, Procedural step 900: Comparison of the relevant overall resistance of the supply leads to the rows 1 through 2 with the upper reference value, Procedural step 1000: If one of the overall resistances of said rows lies above the upper reference value, control unit 10 registers this fact and outputs a signal to the occupant restraint system.

A modification of the method is of course conceivable at any time, for example individual procedural steps are interchangable.

Optionally the reference component 41 can also specify the lower reference value and correspondingly reference component 32 can serve to form the upper reference value, in which case the method described above must be converted. Furthermore, an arrangement of one reference component in a column and a row in each case is not mandatory for executing the method in accordance with the invention. Therefore it is entirely possible for both reference components to be arranged in one column or one row in each case.

The sensor arrangement described is neither restricted to a specific number of sensor elements nor to a fixed number of rows and columns of sensor elements.

The invention claimed is:

1. Method for determining an electrical resistance of an electrical supply lead to sensor elements, in which the sensor elements are interconnected to form a sensor arrangement and in which:
   an overall electrical resistance of the supply lead to the sensor elements is determined by measurement, in which case the overall electrical resistance includes both an electrical resistance of an electrical line to the sensor elements and also an electrical resistance of an electronic component which is arranged in a current path specified by the electrical line;
   the overall electrical resistance of the supply lead to the sensor elements is compared to a reference value, in which case the reference value is a value of an overall electrical resistance of a reference component of the sensor arrangement and its electrical line;
   the reference value is determined through measurement;
   the overall electrical resistance of the supply lead to the sensor elements is compared with a further reference value;
   the further reference value is a value of an overall electrical resistance of a further reference component of the sensor arrangement and its electrical line;
   the further reference value is determined through measurement;
   the further reference value represents an upper permitted limit value of the overall electrical resistance of the supply lead to the sensor elements;
   the sensor elements are arranged as a matrix of rows and columns;
   each row and each column includes an electrical supply lead connected to its sensor elements; and
   the overall resistance of the supply lead of each row and column is determined individually by measurement.

2. Method in accordance with claim 1, in which a signal to a downstream control unit is provided as soon as the upper permitted limit value is exceeded by the measured overall resistance of the supply lead.

3. Method in accordance with claim 1, in which the reference value represents a lower limit value of the overall electrical resistance of the supply lead to the sensor elements.

4. Method in accordance with claim 3, in which a signal is provided to a downstream control unit as soon as the lower reference value is undershot.

5. Method in accordance with claim 1, in which a signal to the downstream control unit is provided as soon as the upper permitted limit value is exceeded by the measured overall resistance of the supply lead.

6. Method in accordance with claim 1, in which, an overall electrical resistance of the supply lead of each row and of each column of the sensor is compared with a further reference value that is determined by measuring an overall electrical resistance of a further reference component of the sensor arrangement and its electrical line, and that represents an upper permitted limit value of the overall electrical resistance of the supply lead.

7. Method in accordance with claim 6, in which, for each respective one of the plurality of supply leads of the rows and columns of the sensor elements, the further reference value represents a lower limit value of the overall electrical resistance of the respective one of the plurality of supply leads.

8. An apparatus including:
   a flat sensor arrangement having interconnected sensor elements and an electrical supply lead to the sensor elements; and
   a control unit for determining an electrical resistance of the electrical supply lead to the sensor elements, wherein the control unit is adapted to:
   determine an overall electrical resistance of the supply lead to the sensor elements by measurement, in which case the overall electrical resistance includes both an electrical resistance of an electrical line to the sensor elements and also an electrical resistance of an electronic component which is arranged in a current path specified by the electrical line;
   compare the overall electrical resistance of the supply lead to the sensor elements to a reference value, in which case the reference value is a value of an overall electrical resistance of a reference component of the sensor arrangement and its electrical line;
   determine the reference value through measurement;
   compare the overall electrical resistance of the supply lead to the sensor elements with a further reference value;
   wherein the further reference value is a value of an overall electrical resistance of a further reference component of the sensor arrangement and its electrical line;

determine the further reference value through measurement wherein the further reference value represents an upper permitted limit value of the overall electrical resistance of the supply lead to the sensor elements; the sensor elements are arranged as a matrix of rows and columns, and each row and each column includes an electrical supply lead connected to its sensor elements; and determine the overall resistance of the supply lead of each row and column individually by measurement.

9. The apparatus in accordance with claim 8 in which the reference component has a resistance value with a low tolerance compared with the sensor elements.

10. Method for determining an electrical resistance of an electrical supply lead of a flat sensor arrangement, the method which comprises:

providing a flat sensor arrangement having interconnected sensor elements and an electrical supply lead to the sensor elements; and determining, with a control unit, an overall electrical resistance of the supply lead to the sensor elements by measurement, in which case the overall electrical resistance includes both an electrical resistance of an electrical line to the sensor elements and also an electrical resistance of an electronic component which is arranged in a current path specified by the electrical line;

comparing, with the control unit, the overall electrical resistance of the supply lead to the sensor elements to a reference value, in which case the reference value is a value of an overall electrical resistance of a reference component of the sensor arrangement and its electrical line;

determining, with the control unit, the reference value through measurement;

comparing, with the control unit, the overall electrical resistance of the supply lead to the sensor elements with a further reference value, wherein the further reference value is a value of an overall electrical resistance of a further reference component of the sensor arrangement and its electrical line;

determining, with the control unit, the further reference value through measurement, wherein the further reference value represents an upper permitted limit value of the overall electrical resistance of the supply lead to the sensor elements, the sensor elements are arranged as a matrix of rows and columns, and each row and each column includes an electrical supply lead connected to its sensor elements; and determining, with the control unit, the overall resistance of the supply lead of each row and column individually by measurement.

\* \* \* \* \*